US012603976B2

(12) United States Patent
Gu

(10) Patent No.: US 12,603,976 B2
(45) Date of Patent: Apr. 14, 2026

(54) FOUNDATION PROJECTION LINE-DRAWING DEVICE AND A LINE-DRAWING METHOD FOR A SPORTS FIELD

(71) Applicant: Bingrong Gu, Ji 'an (CN)

(72) Inventor: Bingrong Gu, Ji 'an (CN)

( * ) Notice: Subject to any disclaimer, the term of this patent is extended or adjusted under 35 U.S.C. 154(b) by 757 days.

(21) Appl. No.: 17/993,958

(22) Filed: Nov. 24, 2022

(65) Prior Publication Data

US 2024/0155090 A1     May 9, 2024

(30) Foreign Application Priority Data

Nov. 7, 2022     (CN) .......................... 202211391066.9

(51) Int. Cl.
*H04N 9/31*          (2006.01)
*G06T 7/246*        (2017.01)

(52) U.S. Cl.
CPC ........... *H04N 9/3182* (2013.01); *G06T 7/246* (2017.01); *G06T 2207/10048* (2013.01); *G06T 2207/30024* (2013.01); *G06T 2207/30241* (2013.01)

(58) Field of Classification Search
CPC .. H04N 9/3182; H04N 9/3129; H04N 9/3185; H04N 9/3194; G06T 7/246; G06T 2207/10048; G06T 2207/30224; G06T 2207/30241
See application file for complete search history.

(56) References Cited

U.S. PATENT DOCUMENTS

| | | | | |
|---|---|---|---|---|
| 5,117,221 A | * | 5/1992 | Mishica, Jr. ............ | G09F 19/18 250/221 |
| 5,976,039 A | * | 11/1999 | Epel ..................... | A63B 61/006 473/490 |
| 6,796,041 B2 | * | 9/2004 | Amron ................. | G01C 15/004 473/490 |
| 6,895,677 B2 | * | 5/2005 | Dinicola .............. | G01C 15/004 473/490 |
| 7,219,438 B2 | * | 5/2007 | Amron ................. | A63C 19/065 33/DIG. 21 |
| 8,979,273 B2 | * | 3/2015 | Ueda .................... | A63C 19/065 353/94 |

(Continued)

FOREIGN PATENT DOCUMENTS

DE          102004007222 A1 * 9/2005 ............. A63B 71/02

*Primary Examiner* — Yaritza Guadalupe-Mccall
(74) *Attorney, Agent, or Firm* — JEEN IP LAW, LLC

(57) ABSTRACT

A line-drawing method for a sports field comprises: the foundation projection line-drawing device obtaining court options input by a user, and obtaining a court size and court shape according to the court options; scanning a pre-projection site to determine the safety of the pre-projection site; if the pre-projection site is safe, using the current pre-projection site as a target projection site, and turning on a laser unit according to the court size and the court shape to form a virtual court, and projecting the virtual court on the target projection site. This method can be used in the field lines of sports ball games. It can frame functional areas, replacing traditional marking lines and rope frame lines. It is more flexible and practical than fixed marking lines. It is strong, and it also solves the disadvantages of the site rope being unsafe, and being blown by the wind.

8 Claims, 3 Drawing Sheets the foundation projection line-drawing device obtaining court options input by a user, and obtaining a court size and court shape according to the court options — 101 the foundation projection line-drawing device scanning a pre-projection site to determine the safety of the pre-projection site — 102 if the pre-projection site is safe, using the current pre-projection site as a target projection site, and turning on a laser unit according to the court size and the court shape to form a virtual court, and projecting the virtual court on the target projection site — 103

(56)        References Cited

U.S. PATENT DOCUMENTS

| | | | |
|---|---|---|---|
| 2004/0111905 A1* | 6/2004 | Amron | G01C 15/004 |
| | | | 33/289 |
| 2008/0018667 A1* | 1/2008 | Cheng | A63F 13/52 |
| | | | 345/632 |
| 2013/0120715 A1* | 5/2013 | Ueda | A63C 19/065 |
| | | | 353/30 |
| 2016/0166912 A1* | 6/2016 | Paredes | A63B 63/00 |
| | | | 473/462 |
| 2020/0032534 A1* | 1/2020 | Crookham | A63B 63/004 |
| 2022/0134214 A1* | 5/2022 | Gupta | H04N 9/3141 |
| | | | 473/459 |
| 2023/0012632 A1* | 1/2023 | Brody | A63F 13/812 |
| 2023/0196770 A1* | 6/2023 | Anton | G06F 3/16 |
| | | | 382/103 |
| 2024/0155090 A1* | 5/2024 | Gu | G06T 7/246 |

* cited by examiner

FOUNDATION PROJECTION LINE-DRAWING DEVICE AND A LINE-DRAWING METHOD FOR A SPORTS FIELD

CROSS-REFERENCE TO RELATED APPLICATIONS

This application claims the benefit and priority of Chinese patent application No. 202211391066.9, filed on Nov. 7, 2022, disclosure of which is hereby incorporated by reference in its entirety.

TECHNICAL FIELD

The present disclosure relates to the technical filed of Laser projection, and in particular to a foundation projection line-drawing device and a line-drawing method for a sports field.

BACKGROUND

At present, courts such as standard badminton courts, volleyball courts, and tennis courts need to be drawn with lines, and although some venues without drawn lines can also be used, they lack entertainment. There is a projection type field instrument, but the instrument is hung above the field and projected downward, so that the light is easy to dazzle and even hurt the eyes during the movement.

In view of this, it is an urgent problem to be solved in this technical field to overcome the shortcomings of the prior art products.

SUMMARY

The technical problem mainly solved by the present disclosure is to provide a foundation projection line-drawing device and a line-drawing method for a sports field, this method of drawing lines can be used in the field of sports ball games. It can frame functional areas through light irradiation, replacing traditional marking lines and other rope frame lines. It is more flexible and practical than fixed marking lines, and more entertaining. It is strong, and it also solves the disadvantages of the site rope being unsafe, not easy to fix, and being blown by the wind.

In order to solve the above-mentioned technical problems, a technical solution adopted by the present disclosure is to provide a line-drawing method for a sports field used for a foundation projection line-drawing device, the foundation projection line-drawing device is installed on the ground, the line-drawing method comprises:

the foundation projection line-drawing device obtaining court options input by a user, and obtaining a court size and court shape according to the court options;

the foundation projection line-drawing device scanning a pre-projection site to determine the safety of the pre-projection site;

if the pre-projection site is safe, using the current pre-projection site as a target projection site, and turning on a laser unit according to the court size and the court shape to form a virtual court, and projecting the virtual court on the target projection site.

Further, the foundation projection line-drawing device scanning a pre-projection site to determine the safety of the pre-projection site comprises:

the foundation projection line-drawing device scanning the range of the pre-projection site to judge a flatness of the pre-projection site;

if the flatness of the pre-projection site meets the requirements, continue to judge whether there is water or sundries in the pre-projection site;

if there is water in the pre-projection site, a drying device is used to remove the water;

if there are sundries in the pre-projection site, remove the sundries.

Further, after the foundation projection line-drawing device scanning the range of the pre-projection site to judge a flatness of the pre-projection site, further comprises:

if the flatness of the pre-projection site does not meet the requirements, send feedback information to the user to reduce the projection range, or send prompt information to the user to shift the projection site.

Further, if the flatness of the pre-projection site does not meet the requirements, send feedback information to the user to reduce the projection range, or send prompt information to the user to shift the projection site, comprises:

if the flatness of the pre-projection site does not meet the requirements, then further determine the position of the non-flat area relative to the pre-projection site;

if the non-flat area is at the edge of the pre-projection site, sending feedback information to the user to reduce the projection range;

if the non-flat area is in the middle of the pre-projection site, sending a prompt information to the user to shift the projection site.

Further, further comprises:

the foundation projection line-drawing device obtaining the position of a ball, and determining whether the ball presses the line or goes out of bounds according to the position of the ball and the frame line of the court;

if the ball presses the line or goes out of bounds, sending a warning information to the user.

Further, the warning information comprises sound information or light information;

if the ball presses the line or goes out of bounds, sending a warning information to the user comprises:

sending a first sound information to the user if the ball goes out of bounds, sending a second sound information to the user if the ball presses the line; or, transforming a color of the virtual court to a first color if the ball goes out of bounds, transforming the color of the virtual court to a second color if the ball presses the line; or, sending the first sound information to the user if the ball goes out of bounds, transforming the color of the virtual court to the second color if the ball presses the line; or, transforming a color of the virtual court to a first color if the ball goes out of bounds, sending a second sound information to the user if the ball presses the line.

Further, the first sound information is "out of bounds" information, the second sound information is "line pressure" information, the first color is red, and the second color is green.

Further, the foundation projection line-drawing device obtaining the position of a ball, and determining whether the ball presses the line or goes out of bounds according to the position of the ball and the frame line of the court comprises:

the foundation projection line-drawing device acquires a court image, and obtains the position of the ball according to the court image to determine whether the ball presses the line or goes out of bounds; wherein, the court image comprises a visible light image or an infrared image, and the court image comprises a ball image and the frame line of the court;

if the court image is the visible light image, analyzing the court image to obtain the ball image, and determining the position of the ball relative to the frame line of the court according to the court image, so as to determine whether the ball presses the line or goes out of bounds;

if the court image is the infrared image, analyzing the court image, and determining the position of the ball relative to the frame line of the court according to the temperature of the ball, so as to determine whether the ball presses the line or goes out of bounds.

Further, a sensing area is set around the virtual court, and a sensing tag is set on the ball; wherein, when the ball enters the sensing area, the sensing tag inside the ball will be activated;

if the foundation projection line-drawing device receives the sensing information sent by the ball, the ball will cross the boundary and send the warning information to the user.

In order to solve the above-mentioned technical problems, an other technical solution adopted by the present disclosure is to provide a foundation projection line-drawing device, comprising a processor, and a memory communicatively coupled to the processor, the processor configured to:

obtaining court options input by a user, and obtaining a court size and court shape according to the court options;

scanning a pre-projection site to determine the safety of the pre-projection site;

if the pre-projection site is safe, using the current pre-projection site as a target projection site, and turning on a laser unit according to the court size and the court shape to form a virtual court, and projecting the virtual court on the target projection site.

The beneficial effects of the present disclosure are: the present disclosure provides a foundation projection line-drawing device and a line-drawing method for a sports field, this method of drawing lines can be used in the field of sports ball games. It can frame functional areas by light irradiation, replacing traditional marking lines and other rope frame lines. It is more flexible and practical than fixed marking lines, and more entertaining. It is strong, and it also solves the disadvantages of the site rope being unsafe, not easy to fix, and being blown by the wind.

Furthermore, it can provide an alarm prompt for the ball jumping out of bounds, and can also identify the ball's pressure line.

BRIEF DESCRIPTION OF DRAWINGS

In order to illustrate the technical solutions of the embodiments of the present disclosure more clearly, the following will briefly introduce the drawings required in the embodiments of the present disclosure. Apparently, the drawings described below are only some embodiments of the present disclosure, and those skilled in the art can obtain other drawings according to these drawings without creative efforts.

DETAILED DESCRIPTION

Figure 1:
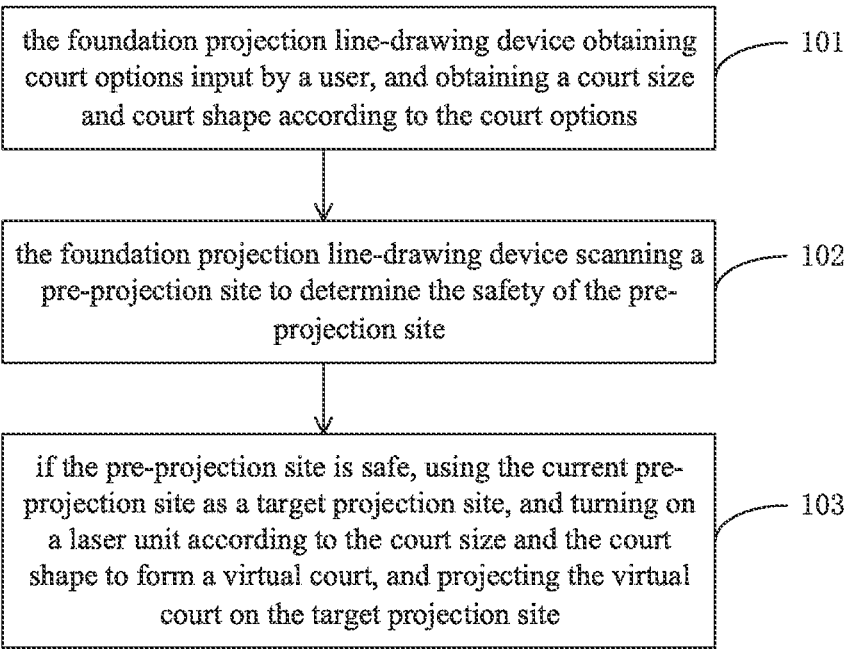
FIG. 1 is a process schematic diagram of a line-drawing method for a sports field according to an embodiment of the present disclosure.

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments of the present disclosure, all other embodiments obtained by those skilled in the art without creative efforts shall fall within the protection scope of the present disclosure.

In the description of the present disclosure, it should be understood that the terms "center", "longitudinal", "lateral", "length", "width", "thickness", "upper", "lower", "front", "The orientation or positional relationship indicated by "rear", "left", "right", "vertical", "horizontal", "top", "bottom", "inside", "outside", etc. is based on the orientation shown in the drawings Or the positional relationship is only for the convenience of describing the present disclosure and simplifying the description, rather than indicating or implying that the referred device or element must have a specific orientation, be constructed and operated in a specific orientation, and therefore should not be construed as a limitation of the present disclosure. In addition, the terms "first" and "second" are only used for descriptive purposes, and should not be construed as indicating or implying relative importance or implying the number of indicated technical features. Thus, features defined as "first" and "second" may explicitly or implicitly include one or more features. In the description of the present disclosure, "plurality" means two or more, unless otherwise expressly and specifically defined.

In the present disclosure, the word "exemplary" is used to mean "serving as an example, illustration or illustration". Any embodiment described herein as "exemplary" is not necessarily to be construed as preferred or advantageous over other embodiments. The following description is given to enable any person skilled in the art to make and use the disclosure. In the following description, details are set forth for purposes of explanation. It should be understood that one of ordinary skill in the art would recognize that the present disclosure may be practiced without the use of these specific details. In other instances, well-known structures and procedures are not described in detail to avoid obscuring the description of the present disclosure with unnecessary detail. Thus, the present disclosure is not intended to be limited to the embodiments shown but is to be accorded the widest scope consistent with the principles and features disclosed herein.

It should be noted that since the methods in the embodiments of the present disclosure are executed in electronic devices, the processing objects of each electronic device exist in the form of data or information, such as time, which is essentially time information. It can be understood that in the subsequent embodiments If the size, quantity, location, etc. are mentioned, the corresponding data exists for electronic equipment to process, and the details will not be repeated here.

Embodiment 1

In order to solve the aforementioned problems, the present embodiment provides a line-drawing method for a sports field, as shown in FIG. 1 to 4, the line-drawing method used for a foundation projection line-drawing device, the foundation projection line-drawing device is installed on the ground, the line-drawing method comprises:

Block 101: the foundation projection line-drawing device obtaining court options input by a user, and obtaining a court size and court shape according to the court options.

Block 102: the foundation projection line-drawing device scanning a pre-projection site to determine the safety of the pre-projection site.

Block 103: if the pro-projection site is safe, using the current pre-projection site as a target projection site, and turning on a laser unit according to the court size and the court shape to form a virtual court, and projecting the virtual court on the target projection site.

Figure 2:
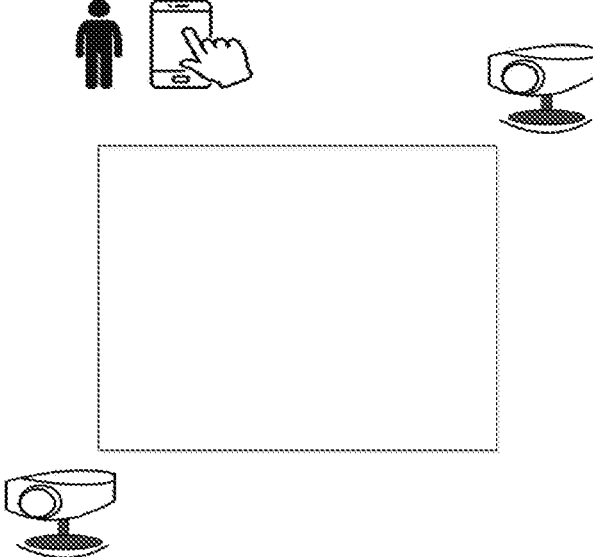
FIG. 2 is a schematic diagram of a site pre-inspection process according to an embodiment of the present disclosure.
Figure 3:
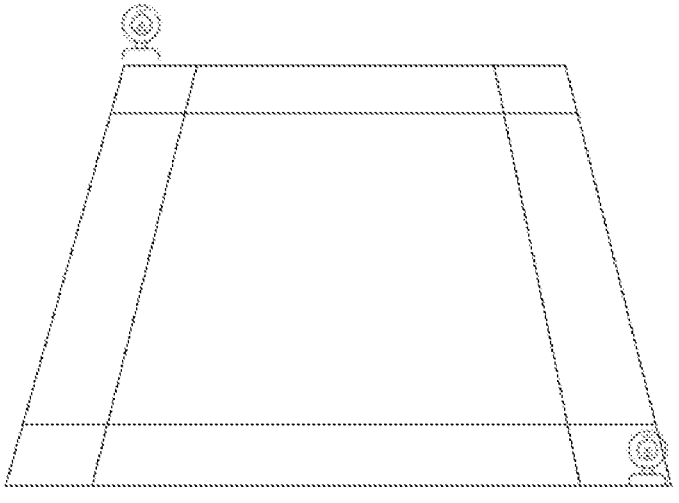
FIG. 3 is a schematic diagram of a sports filed according to an embodiment of the present disclosure.
Figure 4:
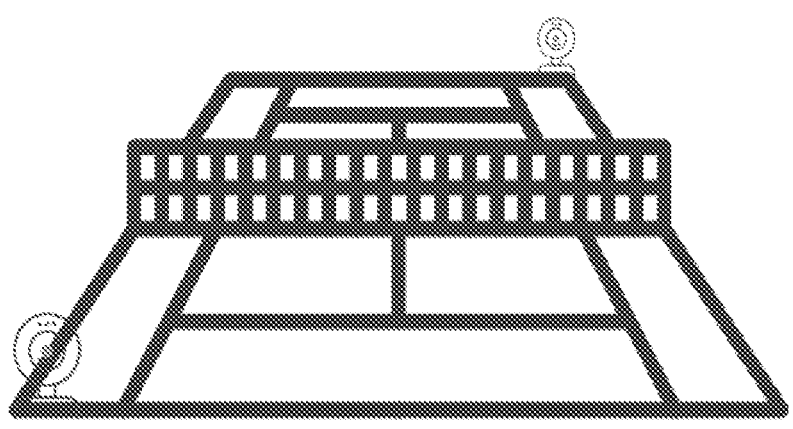
FIG. 4 is another schematic diagram of a sports filed according to an embodiment of the present disclosure.

In block 102, as shown in FIG. 2, the foundation projection line-drawing device scanning a pre-projection site to determine the safety of the pre-projection site comprises: the foundation projection line-drawing device scanning the range of the pre-projection site to judge a flatness of the pre-projection site; if the flatness of the pre-projection site meets the requirements, continue to judge whether there is water or sundries in the pre-projection site; if there is water in the pre-projection site, a drying device is used to remove the water, if there are sundries in the pro-projection site, remove the sundries.

If the flatness of the pre-projection site does not meet the requirements, send feedback information to the user to reduce the projection range, or send prompt information to the user to shift the projection site. specifically, if the flatness of the pre-projection site does not meet the requirements, then further determine the position of the non-flat area relative to the pro-projection site; if the non-flat area is at the edge of the pre-projection site, sending feedback information to the user to reduce the projection range; if the non-flat area is in the middle of the pre-projection site, sending a prompt information to the user to shift the projection site.

Wherein, the edge position refers to a site within a preset length from the boundary line of the pre-projection site, and the middle position refers to a site in the pre-projection site except for the edge position.

That is, if the non-flat area is near the boundary line of the pre-projection site, the feedback information of reducing the projection range will be sent to the user, and if the user's confirmation information is received, the projection range will be reduced, and the reduced projection range will be used as the target projection site, turning on corresponding laser units according to the size of the court (corresponding to the reduced size of the court) and the shape of the court to form a virtual court, and projecting the virtual court onto the target projection court.

Wherein, the principle of flatness through the foundation projection line drawing device is to guide the laser beam emitted by the laser into the telescope barrel, so that it emits a horizontal laser beam along the collimation axis. Using the monochromaticity and coherence of the laser, a piece of glass or metal sheet with a certain light-shielding pattern, that is, a zone plate, can be assembled in front of the telescope objective lens to make diffraction interference. After the telescope is focused, within the focusing range of the zone plate, a bright and fine cross-shaped or circular laser spot is obtained, so that the target can be aimed more accurately. If a photoelectric receiving target capable of automatic tracking is equipped on the front and rear leveling rods, leveling can be carried out. In construction surveying and large-scale component assembly, laser levels are often used to establish horizontal planes or horizontal lines.

In another embodiment, the line-drawing method further comprises: the foundation projection line-drawing device obtaining the position of a ball, and determining whether the ball presses the line or goes out of bounds according to the position of the ball and the frame line of the court; if the ball presses the line or goes out of bounds, sending a warning information to the user.

Wherein the warning information comprises sound information or light information; if the ball presses the line or goes out of bounds, sending a warning information to the user comprises: sending a first sound information to the user if the ball goes out of bounds, sending a second sound information to the user if the ball presses the line; or, transforming a color of the virtual court to a first color if the ball goes out of bounds, transforming the color of the virtual court to a second color if the ball presses the line; or, sending the first sound information to the user if the ball goes out of bounds, transforming the color of the virtual court to the second color if the ball presses the line; or, transforming a color of the virtual court to a first color if the ball goes out of bounds, sending a second sound information to the user if the ball presses the line.

The first sound information is "out of bounds" information, the second sound information is "line pressure" information, the first color is red, and the second color is green.

That is, warning information can be selectively combined according to actual conditions.

In specific application scenarios, the foundation projection line-drawing device obtaining the position of a ball, and determining whether the ball presses the line or goes out of bounds according to the position of the ball and the frame line of the court comprises: the foundation projection line-drawing device acquires a court image, and obtains the position of the ball according to the court image to determine whether the ball presses the line or goes out of bounds; wherein, the court image comprises a visible light image or an infrared image, and the court image comprises a ball image and the frame line of the court; if the court image is the visible light image, analyzing the court image to obtain the ball image, and determining the position of the ball relative to the frame line of the court according to the court image, so as to determine whether the ball presses the line or goes out of bounds; if the court image is the infrared image, analyzing the court image, and determining the position of the ball relative to the frame line of the court according to the temperature of the ball, so as to determine whether the ball presses the line or goes out of bounds.

Figure 5:
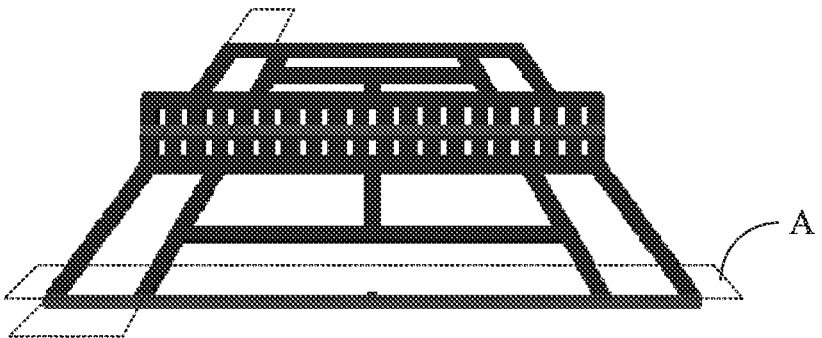
FIG. 5 is another schematic diagram of a sports filed according to an embodiment of the present disclosure.

In another embodiment, as shown in FIG. 5, a sensing area is set around the virtual court, and a sensing tag is set on the ball; wherein, when the ball enters the sensing area, the sensing tag inside the ball will be activated; if the foundation projection line-drawing device receives the sensing information sent by the ball, the ball will cross the boundary and send the warning information to the user.

In an optional solution, the sensing area is a radio frequency sensing area, and the sensing tag is a radio frequency tag. When the ball enters the sensing area, the radio frequency tag in the ball will be activated; If the wireless device receives the carrier information sent by the ball through the radio frequency tag, the ball will cross the boundary and send a warning information to the user. Specifically, the radio frequency induction area sends a certain frequency radio frequency signal through the transmitting antenna. When the radio frequency tag enters the working area of the transmitting antenna, an induced current is generated, and the radio frequency tag obtains energy and is activated; the radio frequency tag sends information such as its own code to the ground through the built-in transmitting antenna. The foundation projection line drawing device, so that the foundation projection line drawing device can carry out cross-border alarm. Among them, the alarm will have sound effects and lights.

In another optional solution, Bluetooth technology, infrared detection technology or pulse induction technology forms a corresponding sensing area and sensing tag. After the sensing tag enters the sensing area, the corresponding function will be activated, and the activated sensing tag will corresponding information can be sent to the foundation projection line drawing device, so that the foundation projection line drawing device can issue a boundary-crossing alarm.

Among them, the laser light is a harmless laser, which can be seen during the day, and the alarm of the floor projection line drawing device will have sound effects and lights to remind.

This method of drawing lines can be used in the field lines of sports ball games. It can frame functional areas through light irradiation, replacing traditional marking lines and other rope frame lines. It is more flexible and practical than fixed marking lines, and more entertaining. It is strong, and it also solves the disadvantages of the site rope being unsafe, not easy to fix, and being blown by the wind. Furthermore, it can provide an alarm prompt for the ball jumping out of bounds, and can also identify the ball's pressure line to avoid misjudgment.

Embodiment 2

In this embodiment, the field frame of the court is presented by light projection. The method is to place the foundation projection line drawing device at the four corners of the field. Different categories set the size of the court, the length of the size and the intensity of the light can be adjusted on the machine, the adjustment of the size and length can irradiate the projected light to the required length, and overlap the light rays from the opposite machine to achieve the effect of forming a sideline. The adjustment can be achieved through the intensity of the laser emitted by the machine to achieve a light effect that can be clearly seen during the day and not dazzling at night. According to the above operations, the sports boundary site is successfully set.

In another embodiment, the foundation projection line drawing device and the ground set a preset inclination angle, and deform the shape of the court set by the user according to the preset inclination angle, so that the shape of the court projected on the ground is consistent with the user's The pitches required are identical in shape. For example, if the shape of the court set by the user is a rectangle, the shape of the court set by the user is deformed according to the preset angle of inclination, and the shape of the court is transformed into a parallelogram. When the court pattern is projected on the ground, the preset tilt angle The angle is reverse compensated so that the pitch projected onto the ground is rectangular.

Embodiment 3

Based on the foregoing embodiments, this embodiment provides a foundation projection line-drawing device, which comprises at least one processor, and a memory connected to the at least one processor in communication; wherein, the memory stores instructions executable by the at least one processor, and the instructions are programmed to execute the line drawing methods described in Embodiment 1 and Embodiment 2.

The line drawing method is specifically: the foundation projection line-drawing device obtaining court options input by a user, and obtaining a court size and court shape according to the court options; the foundation projection line-drawing device scanning a pre-projection site to determine the safety of the pre-projection site; if the pre-projection site is safe, using the current pro-projection site as a target projection site, and turning on a laser unit according to the court size and the court shape to form a virtual court, and projecting the virtual court on the target projection site.

Further, the foundation projection line-drawing device scanning a pre-projection site to determine the safety of the pre-projection site comprises:

the foundation projection line-drawing device scanning the range of the pro-projection site to judge a flatness of the pre-projection site;

if the flatness of the pre-projection site meets the requirements, continue to judge whether there is water or sundries in the pre-projection site;

if there is water in the pro-projection site, a drying device is used to remove the water;

if there are sundries in the pre-projection site, remove the sundries.

Further, after the foundation projection line-drawing device scanning the range of the pre-projection site to judge a flatness of the pre-projection site, further comprises:

if the flatness of the pre-projection site does not meet the requirements, send feedback information to the user to reduce the projection range, or send prompt information to the user to shift the projection site.

Further, if the flatness of the pre-projection site does not meet the requirements, send feedback information to the user to reduce the projection range, or send prompt information to the user to shift the projection site, comprises:

if the flatness of the pre-projection site does not meet the requirements, then further determine the position of the non-flat area relative to the pre-projection site;

if the non-flat area is at the edge of the pre-projection site, sending feedback information to the user to reduce the projection range;

if the non-flat area is in the middle of the pre-projection site, sending a prompt information to the user to shift the projection site.

Further, further comprises:

the foundation projection line-drawing device obtaining the position of a ball, and determining whether the ball presses the line or goes out of bounds according to the position of the ball and the frame line of the court;

if the ball presses the line or goes out of bounds, sending a warning information to the user.

Further, the warning information comprises sound information or light information;

if the ball presses the line or goes out of bounds, sending a warning information to the user comprises:

sending a first sound information to the user if the ball goes out of bounds, sending a second sound information to the user if the ball presses the line; or, transforming a color of the virtual court to a first color if the ball goes out of bounds, transforming the color of the virtual court to a second color if the ball presses the line; or, sending the first sound information to the user if the ball goes out of bounds, transforming the color of the virtual court to the second color if the ball presses the line; or, transforming a color of the virtual court to a first color if the ball goes out of bounds, sending a second sound information to the user if the ball presses the line.

Further, the first sound information is "out of bounds" information, the second sound information is "line pressure" information, the first color is red, and the second color is green.

Further, the foundation projection line-drawing device obtaining the position of a ball, and determining whether the ball presses the line or goes out of bounds according to the position of the ball and the frame line of the court comprises:

the foundation projection line-drawing device acquires a court image, and obtains the position of the ball according to the court image to determine whether the ball presses the line or goes out of bounds; wherein, the court image comprises a visible light image or an infrared image, and the court image comprises a ball image and the frame line of the court;

if the court image is the visible light image, analyzing the court image to obtain the ball image, and determining the position of the ball relative to the frame line of the court according to the court image, so as to determine whether the ball presses the line or goes out of bounds;

if the court image is the infrared image, analyzing the court image, and determining the position of the ball relative to the frame line of the court according to the temperature of the ball, so as to determine whether the ball presses the line or goes out of bounds.

Further, a sensing area is set around the virtual court, and a sensing tag is set on the ball; wherein, when the ball enters the sensing area, the sensing tag inside the ball will be activated;

if the foundation projection line-drawing device receives the sensing information sent by the ball, the ball will cross the boundary and send the warning information to the user.

This method of drawing lines can be used in the field of sports ball games. It can frame functional areas through light irradiation, replacing traditional marking lines and other rope frame lines. It is more flexible and practical than fixed marking lines, and more entertaining. It is strong, and it also solves the disadvantages of the site rope being unsafe, not easy to fix, and being blown by the wind. Furthermore, it can provide an alarm prompt for the ball jumping out of bounds, and can also identify the ball's pressure line.

The above is only the embodiment of the present disclosure, and does not limit the patent scope of the present disclosure. Any equivalent structure or equivalent process conversion made by using the description of the present disclosure and the contents of the accompanying drawings, or directly or indirectly used in other related technologies fields, all of which are equally included in the scope of patent protection of the present disclosure.

What is claimed is:

1. A line-drawing method for a sports field comprises:
obtaining court options input by a user, and obtaining a court size and court shape according to the court options;
scanning the range of the pre-projection site to judge a flatness of the pre-projection site;
if the flatness of the pre-projection site meets the requirements, continue to judge whether there is water or sundries in the pre-projection site;
if there is water in the pre-projection site, a drying device is used to remove the water;
if there are sundries in the pre-projection site, remove the sundries;

using the current pre-projection site as a target projection site, and turning on a laser unit according to the court size and the court shape to form a virtual court, and projecting the virtual court on the target projection site.

2. The line-drawing method according to claim 1, wherein after scanning the range of the pre-projection site to judge a flatness of the pre-projection site, further comprises:
if the flatness of the pre-projection site does not meet the requirements, send feedback information to the user to reduce the projection range, or send prompt information to the user to shift the projection site.

3. The line-drawing method according to claim 2, wherein if the flatness of the pre-projection site does not meet the requirements, send feedback information to the user to reduce the projection range, or send prompt information to the user to shift the projection site, comprises:
if the flatness of the pre-projection site does not meet the requirements, then further determine the position of the non-flat area relative to the pre-projection site;
if the non-flat area is at the edge of the pre-projection site, sending feedback information to the user to reduce the projection range;
if the non-flat area is in the middle of the pre-projection site, sending a prompt information to the user to shift the projection site.

4. The line-drawing method according to claim 1, wherein further comprises:
obtaining the position of a ball, and determining whether the ball presses the line or goes out of bounds according to the position of the ball and the frame line of the court;
if the ball presses the line or goes out of bounds, sending a warning information to the user.

5. The line-drawing method according to claim 4, wherein the warning information comprises sound information or light information;
if the ball presses the line or goes out of bounds, sending a warning information to the user comprises:
sending a first sound information to the user if the ball goes out of bounds, sending a second sound information to the user if the ball presses the line; or,
transforming a color of the virtual court to a first color if the ball goes out of bounds, transforming the color of the virtual court to a second color if the ball presses the line; or,
sending the first sound information to the user if the ball goes out of bounds, transforming the color of the virtual court to the second color if the ball presses the line; or,
transforming a color of the virtual court to a first color if the ball goes out of bounds, sending a second sound information to the user if the ball presses the line.

6. The line-drawing method according to claim 5, wherein the first sound information is "out of bounds" information, the second sound information is "line pressure" information, the first color is red, and the second color is green.

7. The line-drawing method according to claim 4, wherein obtaining the position of a ball, and determining whether the ball presses the line or goes out of bounds according to the position of the ball and the frame line of the court comprises:
acquiring a court image, and obtains the position of the ball according to the court image to determine whether the ball presses the line or goes out of bounds; wherein, the court image comprises a visible light image or an infrared image, and the court image comprises a ball image and the frame line of the court;
if the court image is the visible light image, analyzing the court image to obtain the ball image, and determining the position of the ball relative to the frame line of the court according to the court image, so as to determine whether the ball presses the line or goes out of bounds;

if the court image is the infrared image, analyzing the court image, and determining the position of the ball relative to the frame line of the court according to the temperature of the ball, so as to determine whether the ball presses the line or goes out of bounds.

8. The line-drawing method according to claim 1, wherein a sensing area is set around the virtual court, and a sensing tag is set on the ball; wherein, when the ball enters the sensing area, the sensing tag inside the ball will be activated;

if receiving the sensing information sent by the ball, the ball will cross the boundary and send the warning information to the user.

\* \* \* \* \*